(12) United States Patent
Kim

(10) Patent No.: US 9,109,809 B2
(45) Date of Patent: Aug. 18, 2015

(54) METHOD OF CONDITIONING AIR WITH A REFRIGERATION LOOP CONNECTED TO A WATER CIRCUIT

(75) Inventor: Hong Ryeol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 454 days.

(21) Appl. No.: 13/318,456

(22) PCT Filed: Apr. 30, 2010

(86) PCT No.: PCT/KR2010/002746
§ 371 (c)(1),
(2), (4) Date: Feb. 16, 2012

(87) PCT Pub. No.: WO2010/126329
PCT Pub. Date: Nov. 4, 2010

(65) Prior Publication Data
US 2012/0131933 A1    May 31, 2012

(30) Foreign Application Priority Data
May 1, 2009    (KR) .......................... 10-2009-0038687

(51) Int. Cl.
*F24F 11/04* (2006.01)
*F24F 11/00* (2006.01)
(Continued)

(52) U.S. Cl.
CPC ........... *F24F 11/0012* (2013.01); *F24F 3/0442* (2013.01); *F24F 11/008* (2013.01); *F25B 49/022* (2013.01); *F24F 2011/0075* (2013.01); *F25B 2600/112* (2013.01); *F25B 2700/2104* (2013.01); *F25D 17/02* (2013.01); *Y02B 30/767* (2013.01)

(58) Field of Classification Search
CPC ............... F25B 39/022; F25B 2600/02; F25B 2600/112; F25B 2700/2104; F25B 2700/21171; F24F 3/0442; F24F 11/0012; F25D 17/02
USPC ........ 62/180, 183–186, 201, 228.1, 215, 226, 62/229
See application file for complete search history.

(56) References Cited

U.S. PATENT DOCUMENTS 4,438,881 A * 3/1984 Pendergrass ................... 237/2 B
4,873,649 A * 10/1989 Grald et al. .................... 700/276
(Continued)

FOREIGN PATENT DOCUMENTS

JP        2004309027    * 9/2004
JP        2006-194478     7/2006
(Continued)

OTHER PUBLICATIONS

Machine translation of JP 2004309027.*

*Primary Examiner* — Marc Norman
*Assistant Examiner* — Max Snow
(74) *Attorney, Agent, or Firm* — Dentons US LLP

(57) ABSTRACT

An air conditioner intakes indoor air and outdoor air, blows it through a heat exchanger, then supplies the conditioned air to an indoor space. In the heat exchanger, water cools the air. A remote refrigeration circuit, also known as a chiller, cools the water. A controller controls the chilled water to stay within a temperature range. When the chilled water exceeds the temperature range, the air conditioning fan is decelerated, thus reducing the amount of heat that the water absorbs from the air. When the desired indoor temperature is less than the actual indoor temperature, then the fan is returned to its maximum velocity.

5 Claims, 3 Drawing Sheets

(51) Int. Cl.
  *F24F 3/044* (2006.01)
  *F25B 49/02* (2006.01)
  *F25D 17/02* (2006.01)

(56) References Cited

U.S. PATENT DOCUMENTS

| | | | | |
|---|---|---|---|---|
| 5,040,377 | A * | 8/1991 | Braun et al. | 62/183 |
| 5,133,193 | A * | 7/1992 | Wruck et al. | 62/99 |
| 5,579,993 | A * | 12/1996 | Ahmed et al. | 236/49.3 |
| 5,765,383 | A * | 6/1998 | Inoue | 62/209 |
| 5,963,458 | A * | 10/1999 | Cascia | 700/300 |
| 6,269,650 | B1 * | 8/2001 | Shaw | 62/176.6 |
| 6,276,152 | B1 * | 8/2001 | Sibik | 62/201 |
| 6,560,980 | B2 * | 5/2003 | Gustafson et al. | 62/186 |
| 6,698,219 | B2 * | 3/2004 | Sekhar et al. | 62/179 |
| 7,340,912 | B1 * | 3/2008 | Yoho et al. | 62/305 |
| 7,370,490 | B2 * | 5/2008 | Li | 62/305 |
| 8,161,760 | B2 * | 4/2012 | Cur et al. | 62/175 |
| 8,286,445 | B2 * | 10/2012 | Park et al. | 62/506 |
| 2007/0107450 | A1 * | 5/2007 | Sasao et al. | 62/185 |
| 2007/0181701 | A1 * | 8/2007 | Cheng et al. | 236/49.3 |
| 2008/0179409 | A1 * | 7/2008 | Seem | 236/49.3 |
| 2008/0276630 | A1 * | 11/2008 | Lukitobudi | 62/93 |

FOREIGN PATENT DOCUMENTS

| KR | 10-0625567 | 9/2006 |
|---|---|---|
| KR | 10-0903148 | 6/2009 |

* cited by examiner ered.
METHOD OF CONDITIONING AIR WITH A REFRIGERATION LOOP CONNECTED TO A WATER CIRCUIT This application is a 35 U.S.C. §371 National Stage Entry of International Application No. PCT/KR2010/002746, filed on Apr. 30, 2010, and claims priority to Korean Patent Application No. 10-2009-0038687, filed on May 1, 2009, both of which are hereby incorporated by reference in their entirety for all purposes as if fully set forth herein.

TECHNICAL FIELD

The present invention relates to an air conditioner and operation method of the same, more particularly, to an air conditioner and the operation method of the same which cools water by a refrigeration cycle and performs heat-exchange between an air and the chilled water and supplies the air to an indoor space.

BACKGROUND ART

Generally, an air conditioner is an appliance which cools or heats an indoor space by using a refrigeration cycle of a refrigerant comprising a compressor, a condenser, an expansion device and an evaporator so as to offer a pleasant indoor environment to users.

The air conditioner comprises an evaporator which performs heat exchange between water and a refrigerant, and a heat exchanger such as a chilled water coil in which the water cooled by the heat exchange cools an air, so that the chilled air cooled by the heat exchanger blows to the indoor space and can cool the indoor space.

In the conventional air conditioner, if the air conditioner operates, a compressor is operated, and if the air conditioner stops, the compressor is stopped. When the compressor is operated, the chilled water can cool an air and the air can cool the indoor space. If the temperature of the chilled water is not appropriately changed according to the cooling load of the indoor space, the air conditioner is difficult to operate by optimum efficiency and to respond to the partial load effectively.

DISCLOSURE

Technical Problem

Accordingly, the present invention is directed to an air conditioner and operation method of the same that substantially obviate one or more problems due to limitations and disadvantages of the related art.

An object of the present invention is to provide an air conditioner, which can prevent super-cooling and over-drying of the indoor space by controlling the chilled water temperature and the chilly air temperature.

Another object of the present invention is to provide an operation method of the air conditioner which can change the chilled water set temperature of the chilled water supplied from a chiller according to the indoor temperature.

Technical Solution

To achieve these objects and other advantages and in accordance with the purpose of the invention, there is provided an air conditioner comprising: an air handling unit, which comprises a fan for supplying the air mixed the indoor air with the outdoor air to the indoor space and a heat exchanger for exchanging the mixed air blowing by the fan with the chilled water and a temperature sensor for sensing temperature, and a chiller, which includes a compressor, a condenser, an expansion device and an evaporator and supplies the chilled water from the evaporator to the heat exchanger through a water pipe connecting the evaporator with the heat exchanger. The chiller communicates with the air-handling unit and sets a chilled water set temperature of the chilled water supplied from the evaporator to the heat exchanger according to the result sensed by the temperature sensor and changes the driving capacity of the compressor according the chilled water set temperature.

The temperature sensor comprises an indoor temperature sensor for sensing an indoor temperature and a supply air temperature sensor for sensing a temperature of the air supplied to the indoor space.

The indoor temperature sensor is disposed at an indoor air inlet of the air-handling unit.

The supply air temperature sensor is disposed between an air-conditioned air outlet of the air handling unit and the heat exchanger.

The air-handling unit further comprises an air-handling unit controller, which transmits the sense result of each the indoor temperature sensor and the supply air temperature sensor to the chiller.

The chiller further a chiller controller which receives the sense result of each the indoor temperature sensor and the supply air temperature sensor from the air handling unit controller and controls the compressor capacity according to the chilled water set temperature.

The air handling unit controller controls a velocity of the fan according to the chilled water set temperature.

There is provided an operation method of an air conditioner that comprises that comprises: an air-handling unit, which comprises a fan for supplying the air mixed the indoor air with the outdoor air to the indoor space and a heat exchanger for exchanging the mixed air blowing by the fan with the chilled water, and a chiller, which comprises a compressor, a condenser, an expansion device and an evaporator and supplies the chilled water from the evaporator to the heat exchanger through a water pipe connecting the evaporator and the heat exchanger. Wherein the operation method comprises; setting a chilled water set temperature by the chiller after sensing the temperature by the air handling unit and transmitting the sensed temperature to the chiller; and controlling a compressor capacity according to the chilled water set temperature set in the setting a chilled water set temperature.

In the setting the chilled water set temperature, an indoor temperature sensor senses the indoor temperature and a supply air temperature sensor senses the temperature of the supply air supplied to the indoor space. It performs a set of the chilled water temperature according to the indoor temperature sensed by the indoor temperature sensor and the supply air temperature sensed by the supply air temperature sensor.

In the setting the chilled water set temperature, it sets a supply air set temperature by adding the present supply air temperature sensed by the supply air temperature sensor to the temperature difference between the temperature sensed by the indoor temperature sensor and the indoor set temperature. It sets a chilled water set temperature corresponding to the supply air set temperature.

It further comprises decelerating the fan for reducing the velocity of the fan, when the chilled water set temperature reaches to the upper limit of the chilled water temperature during controlling the compressor capacity.

It further comprises accelerating the fan for increasing the velocity of the fan, when the indoor set temperature is lower than the temperature sensed by the indoor temperature sensor during decelerating the fan.

It further comprises resetting the chilled water set temperature by the chiller after sensing a temperature by the air handling unit and transmitting the sensed temperature to the chiller if the velocity of the fan reaches to the maximum velocity of the fan during accelerating the fan; and recontrolling a compressor capacity for controlling the operation capacity of the compressor according to the chilled water set temperature reset in resetting the chilled water set temperature.

In resetting the chilled water set temperature, it may set a supply air set temperature by subtracting the temperature difference between the indoor set temperature and the indoor temperature sensed by the indoor temperature sensor from the supply air temperature sensed by the supply air temperature sensor. It may set chilled water set temperature corresponding to the supply air set temperature.

Advantageous Effects

According to the present invention as stated above, it can prevent supercooling and excessive dehumidification of the indoor space when a chilled water temperature of a heat-exchanger is too low for a load of the indoor space. It can perform the sufficient cooling and dehumidification by the minimum electric consumption.

In the present invention, if it is difficult to control the indoor temperature by controlling the chilled water set temperature, it can control the indoor temperature by controlling the velocity of a fan of an air-handling unit. Thus, it is possible to operate an air conditioner efficiently.

BEST MODE

The present invention will hereinafter be described in detail with reference to the accompanying drawings in which exemplary embodiments of the invention are shown.

Figure 1:
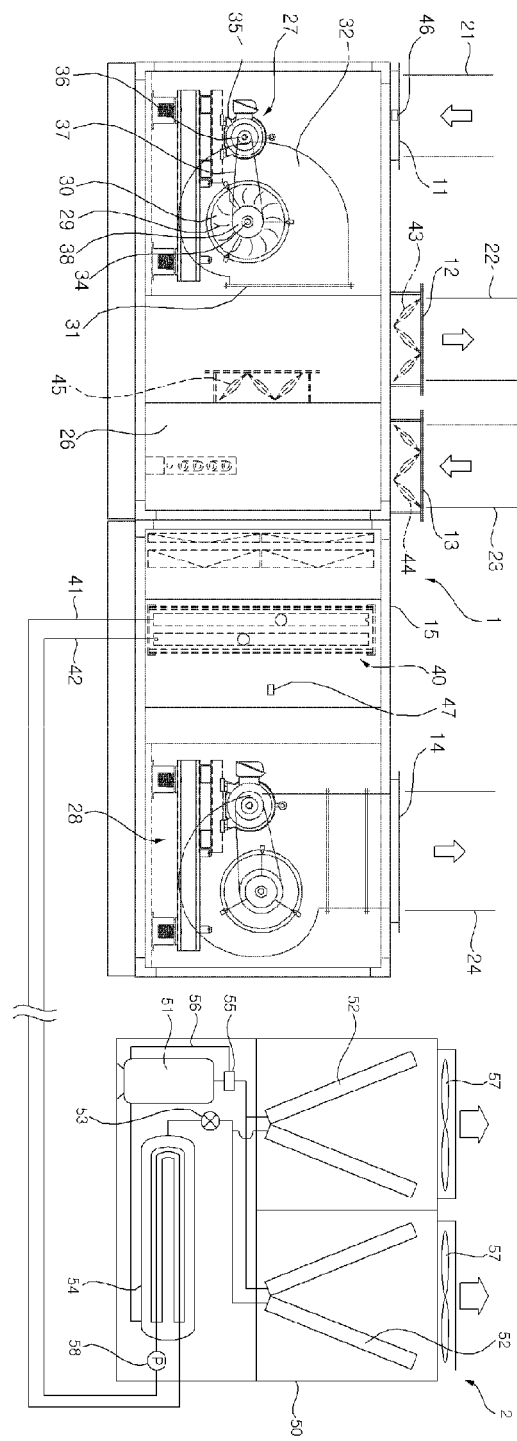
FIG. 1 is a schematic diagram of an air conditioner according to an embodiment of the present invention.
Figure 2:
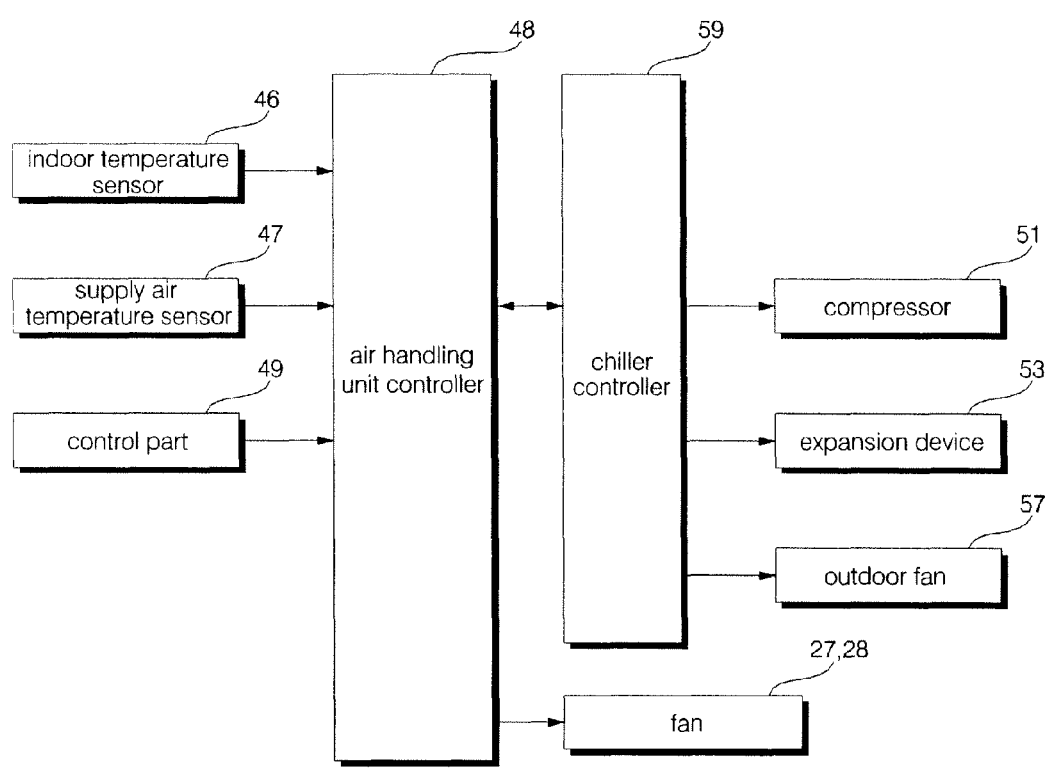
FIG. 2 is a block diagram of an air conditioner according to the present invention.

FIG. 1 is a schematic diagram of an air conditioner according to an embodiment of the present invention. FIG. 2 is a block diagram of an air conditioner according to the present invention.

Referring to FIG. 1, an air conditioner according to the exemplary embodiment of the present invention comprises an air-handling unit 1 and a chiller 2.

The air-handling unit 1 comprises an air conditioning unit with ventilation function, which mixes the indoor air with the outdoor air and heat-exchanges the mixed air in a heat exchanger and then supplies to the heat-exchanged air to the room.

The air-handling unit 1 may be installed in the air conditioning room or the machine room, which is apart from the room that the air-handling unit 1 performs the air conditioning in the building installed the air conditioner. In addition, the air-handling units 1 may be installed in the outside.

The air-handling unit 1 includes an air-handling unit case 15, which has a space on the inside and comprises an indoor air intake part 11 and an indoor air discharge part 12 and an outdoor air intake part 13 and an air-conditioned air discharge part 14.

The air-handling unit 1 further comprises fans 27 and 28, which are disposed in the inside of the air-handling unit case 15 and make the indoor air and the outdoor air flow, and a heat exchanger 40 disposed in the air-handling unit case 15 and heat-exchanges the air flowing to the air-conditioned air discharge part 14 with the chilled water.

The air-handling unit 1 connects with a ventilation duct 21, which connects the indoor space and the indoor air intake part 11 for inhaling indoor air into the air-handling unit case 15 through the indoor air intake part 11.

The air-handling unit 1 connects with an exhaust duct 22, which connects the outdoor and the indoor air discharge part 12 for discharging some of the air inhaled into the air-handling unit case 15 through the indoor air intake part 11 to the outdoor.

The air-handling unit 1 connects with an outdoor air duct 23, which connects the outdoor and the outdoor air intake part 13 for inhaling the outdoor air into the air-handling unit case 15 through the outdoor air intake part 13.

The air-handling unit 1 connects with an air supply duct 24, which connects the air-conditioned air discharge part 14 and the indoor space for supplying the air-conditioned air of the air-handling unit case 15 to the indoor space.

The ventilation duct 21 connects to the indoor air intake part 11, the exhaust duct 22 connects to the indoor air discharge part 12, the outdoor air duct 23 connects to the outdoor air intake part 13, and the air supply duct 24 connects the air-conditioned air discharge part 14.

In the air-handling unit 1, some of the indoor air inhaled to the indoor air intake part 11 discharges to the outdoor through the indoor air discharge part 12, the rest mixes with the outdoor air inhaled to the outdoor air intake part 13. The mixed air heat-exchanges with the heat exchanger 40 and then supplies to the indoor space through the air-conditioned air discharge part 14 and the air supply duct 19.

In the air-handling unit 1, a mixing chamber 26 for mixing the indoor air with the outdoor air is disposed at the front of the heat exchanger 40 in the air flow direction.

The fans 27 and 28 comprise a return fan 27, which is disposed at the space between the indoor air intake part 11 and the indoor air discharge part 12 in the air flow direction and inhales the indoor air into the air-handling unit case 15 and blows the air inhaled, and a supply fan 28, which is disposed at the space between the heat exchanger 40 and the air-conditioned air discharge part 14 in the air flow direction and inhales the mixed air into the heat exchanger 40 and blows the air inhaled to the air-conditioned air discharge part 14.

The fans 27 and 28 comprise a variable air volume fan to control air volume. The fans 27 and 28 comprise a blower 29, and a housing 32 which surrounds the blower 29 and includes an air inlet 30 and an air outlet 31, and a blower driver 33 for rotating the blower 29.

The blower driver 33 may comprise a motor that a rotary shaft connects to the center of rotation of the blower 29. Also, The blower driver 33 may comprise a shaft 34 connected to the center of rotation of the blower 29, and a motor 35 disposed at the outside of the housing 32, and a power transmission device for transmitting a driving power of the motor 35 to the shaft 34.

The power transmission device may comprise a driving pulley 36 disposed at the shaft of the motor 35, and a driven pulley 38 disposed at the shaft 34, and a belt 37 wrapped around the driving pulley 35 and the driven pulley 38.

The motor 35 may comprise an inverter motor to change rpm of the blower 29. The heat exchanger 40 is a kind of cooling coil for cooling the mixed air by heat exchanging the mixed air and chilled water. The heat exchanger 40 includes a chilled water coil having a flow path which chilled water passes through.

The heat exchanger 40 is disposed at the space between the mixing chamber 26 and the supply fan 27 and connects with the chiller 2 by the water pipes 41 and 42.

The air-handling unit 1 further comprises dampers 43, 44 and 45, which can control the ratio of the indoor air to the outdoor air in the mixed air.

The dampers 43, 44 and 45 comprise a exhaust damper 43, which is disposed at the indoor air discharge part 12 and controls the discharge amount of the indoor air, and a outdoor air damper 44, which is disposed at the outdoor air intake part 13 and controls the intake amount of the outdoor air, and a mixture damper 45, which is disposed at the mixing chamber 26 and controls the amount of the air being inhaled into the mixing chamber 26.

The air handling unit 1 includes temperature sensors 46 and 47 for sensing the temperature. The temperature sensors 46 and 47 sense the temperature of the air flowing into the air handling unit 1 and the temperature of the air discharging to the indoor space after exchanging the heat by the heat exchanger 40 in the air handling unit 1.

The temperature sensors 46 and 47 includes an indoor temperature sensor 46 for sensing the indoor temperature Trs and a supply air temperature sensor 47 for sensing temperature Tss of the air supplied to the indoor space. The indoor temperature sensor 46 may be installed in the room for air-conditioning or one of the indoor air intake part 11 and the ventilation duct 21. The supply air temperature sensor 47 may be installed at a space between the heat exchanger 40 and the air-conditioned air discharge part 14.

The air handling unit 1 further includes an air handling unit controller 48 which transmits the result sensed by the temperature sensor such as the indoor temperature sensor 46 and the supply air temperature sensor 47 to the chiller 2. The chiller 2 is a chilled water supply unit for supplying to the heat exchanger 40 of the air handling unit 1 by a refrigerant cycle.

The chiller 2 comprises a chiller case 50, a compressor 51 for compressing refrigerant, a condenser 52 for condensing the refrigerant compressed in the compressor 51, an expansion device 53 for expanding the refrigerant condensed in the condenser 52, and an evaporator 54 for evaporating the refrigerant expanded in the expansion device 53 by heat-exchanging the expanded refrigerant with water.

The chiller 2 forms of refrigerant cycle by the compressor 51, the condenser 52, and the expansion device 53, and the evaporator 54.

If the condenser 52 is an air-cooling type, the chiller 2 may be installed in the outside. In addition, if the condenser 52 is a water-cooling type, the chiller 2 may be installed in the machine room such as the basement or the outside.

The compressor 51, the condenser 52, the expansion device 53 and the evaporator are installed at the chiller case 50. If the condenser 52 is an air-cooling type, the outdoor air flows into the chiller case 50 and exchanges the heat with the condenser 52 and discharges to the outside of the chiller case 50. The compressor 51 comprises a variable capacity compressor for changing a capacity. It is possible to drive some or all the compressors according to the load. In addition, it is possible to use an inverter compressor for changing a frequency according to the load.

A discharge pipe of the compressor 51 connects to the condenser 52. An oil separator 55 is disposed at the discharge pipe of the compressor 51 for separating the refrigerant discharged from the compressor 51 into refrigerant and oil. The oil separator 55 connects with an oil collection path 56 for returning the oil to the compressor 51.

The condenser 52 may condense refrigerant by the outdoor air sent by the outdoor fan 57 or may condense refrigerant by the cold water supplied from a cooling tower (not shown). Hereinafter, it is described that the outdoor air sent by the outdoor fan 57 condenses the refrigerant.

The evaporator 54 connects with the heat exchanger 40 of the air-handling unit 1 and the water pipes 41 and 42 and is a kind of a cooler for cooling water by evaporation of the refrigerant expanded from the expansion device 53.

In the evaporator 54, a heat-exchanger part is sandwiched in between a refrigerant path for passing refrigerant and a water path for passing water.

The evaporator 54 comprises a plurality of inner tubes which form the water path for passing water, and a shell-tube type heat exchanger which is disposed at the outside of the inner tubes and includes a shell. The shell includes refrigerant tube which is disposed at the space among the inner tubes for passing refrigerant.

The plurality of inner tubes of the evaporator 54 connects with the water pipes 41 and 42. The heat exchanger 40 of the air handling unit 1, the water pipes 41 and 42, and the pluralities of inner tubes are formed into a chilled water circulation flow path.

The water pipes 41 and 42 are disposed to pass through each the chiller case 50 and the air-handling unit case 15. A chilled water pump 58 is installed at the water pipes 41 and 42 for pumping and circulating the chilled water.

It is possible that the chilled water pump 58 is installed at a position of the water pipes 41 and 42 located at the inside of the air-handling unit 1 or is installed at a position of the water pipes 41 and 42 located at the inside of the chiller 2 or is installed at a position of the water pipe located at the space between the air-handling unit 1 and the chiller 2.

It is desirable that the chilled water pump 58 is installed at the inside of the air handling unit 1 or the inside of the chiller 2 so as to easy to connect an electric wire or to control that.

In the chiller 2, the temperature of chilled water discharged from the evaporator 54 depends on the capacity of the compressor 51. The capacity of the compressor 51 is controlled by the chilled water set temperature Twt.

The chiller 2 communicates with the air handling unit 1 and controls the chilled water set temperature Twt of the chilled water supplied to the heat exchanger 40 from the evaporator 54 according to the result sensed by the temperature sensors 46 and 47.

The chiller 2 further includes a chiller controller 59 which receives the result sensed by the indoor temperature sensor 46 and the supply air temperature sensor 47 from the air handling unit controller 48 and controls the capacity of the compressor 51 according to a chilled water set temperature Twt.

The chiller controller 59 set chilled water set temperature Twt according to the temperature sensed by the indoor temperature sensor 46 and the temperature sensed by the supply air temperature sensor 47 and controls the capacity of the compressor according to the chilled water set temperature Twt. The chiller controller 59 sets the cold water set temperature Twt in the range of the lower limit Twtmin to the upper limit Twtmax so that the chilled water temperature is variable in the range.

If the indoor set temperature Ti (the indoor hope temperature) is set by a control part 49 controlled by users or by a manufacturer or an engineer, the chiller controller 59 may set the chilled water set temperature Twt according to the indoor set temperature Ti.

The chiller controller 59 sets a supply air set temperature Tst by adding the present supply air temperature Tss sensed by the supply air temperature sensor 47 to the temperature difference between the temperature Trs sensed by the indoor temperature sensor 46 and the indoor set temperature Ti.

The chiller controller 59 calculates chilled water set temperature Twt corresponding to the supply air set temperature Tst by the pre-stored table or a numerical formula and controls the compressor 1 by the capacity corresponding to the calculated chilled water set temperature Twt.

The air handling unit 1, particularly the air handling unit controller 48 controls velocity of the fan 27 and 28 according to the chilled water set temperature Twt set.

An operation of the present invention will hereinafter be described in detail.

If a user operates the air conditioner by the control part 49, the air handling unit controller 48 drives the fan 27 and 28, and the chiller controller 59 drives the compressor 51 and the outdoor fan 57 and controls the opening degree of the expansion device 53. The one of the air handling unit controller 48 and the chiller controller 59 drives the chilled water pump 58.

While the compressor 51 is operated, refrigerant is circulated through the compressor 51, the condenser 52, the expansion device 53 and the evaporator 54. At this time, the refrigerant passing through the evaporator 54 takes the heat of water so that the temperature of water is decreased.

While the cold-water pump 58 is operated, the water chilled by the evaporator 54 cools down the heat exchanger 40 of the air-handling unit 1 by passing through one of the water pipes 41 and 42 and then returns to the evaporator 54 by passing through the other of the water pipes 41 and 42. At this time, water cools the heat exchanger 40 by circulating the evaporator 54 and the heat exchanger 40.

While the fans 27 and 28 are operated, the indoor air is inhaled to the inside of the air-handling unit case 15 through the ventilation duct 21. Some of the inhaled air discharge to the outdoor space through the exhaust duct 22, the rest is inhaled to the mixing chamber 26. And the outdoor air is inhaled to the mixing chamber 26 through the outdoor air duct 23 and is mixed with some indoor air inhaled to the mixing chamber 26 of the indoor air. The mixed air passes through the heat exchanger 40 and loses the heat to the water passing through the heat exchanger 40. Thus, the temperature of the mixed air is decreased, and the air is supplied to the indoor space through the air supply duct 34.

While the air conditioner as stated above is operated, the chiller controller 59 determines the capacity of the compressor 51 according to a chilled water set temperature Twt and drives the compressor 51 according to the determined capacity.

In the beginning of operation of the air conditioner, the chiller controller 59 sets a chilled water set temperature Twt to a standard chilled water set temperature in the range of the chilled water set temperature and drives the compressor 51 and then controls the indoor temperature by changing the chilled water set temperature Twt of the chiller 2 by using the temperature sensed by the temperature sensors 27 and 28.

If the air handling unit controller 48 can't control the temperature by change of the chilled water set temperature Twt any more, the indoor temperature may be controlled by changing the velocity of the fan 27 and 28.

Hereinafter, an operation method of the present invention will be described in detail.

Figure 3:
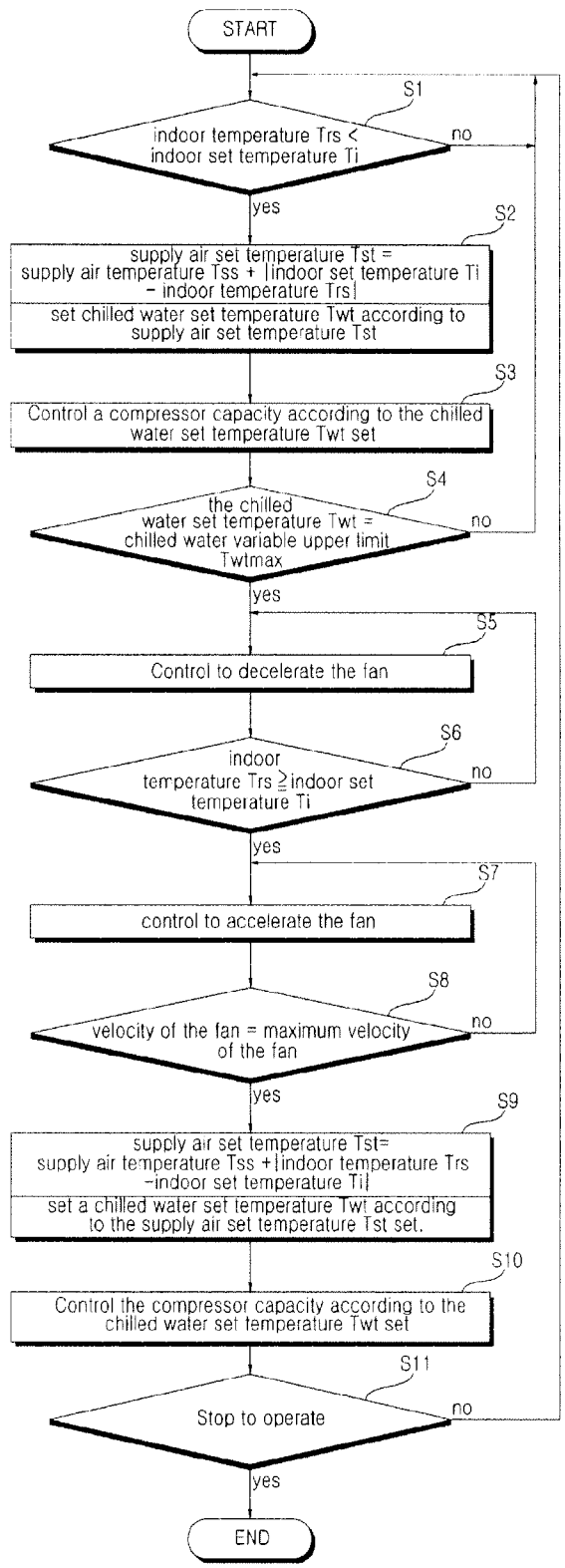
FIG. 3 is a flow chart showing an operation method of an air conditioner according to the exemplary embodiment of the present invention.

FIG. 3 is a flow chart showing an operation method of an air conditioner according to the exemplary embodiment of the present invention.

An operation method of an air conditioner according to the exemplary embodiment of the present invention comprises setting chilled water set temperature S1 and S2, controlling a compressor capacity S3, decelerating the fan S4 and S5, accelerating the fan S6 and S7, resetting the chilled water set temperature S8 and S9, and recontrolling a compressor capacity S10.

In setting chilled water set temperature S1 and S2, the air handling unit 1 senses temperature and transmits the sensed temperature to the chiller 2, and the chiller 2 sets a chilled water set temperature.

The step of setting the chilled water set temperature S1 and S2 further includes a temperature sensing course that, the indoor temperature sensor 46 senses the indoor temperature Trs and the supply air temperature sensor 47 senses the supply air temperature Tss.

The step of setting the chilled water set temperature S1 and S2 further includes a temperature transmitting course that the indoor temperature Trs sensed in the temperature sensing course and the supply air temperature Tss are inputted to the air handling unit controller 48 and then are transmitted to the chiller controller 57.

The step of the chilled water set temperature S1 and S2 further includes a course of calculating chilled water set temperature. In the course of calculating chilled water set temperature, if the temperature transmitted in the temperature transmitting course is inputted to the chiller controller 57, a supply air set temperature Tst is set, and a chilled water set temperature Twt is calculated corresponding to the supply air set temperature Tst set.

In setting the chilled water set temperature S1 and S2, if an indoor temperature Trs is lower than the indoor set temperature Ti, the supply air set temperature Tst is set higher than the previous supply air set temperature Tst, a chilled water set temperature Twt is set higher than the previous the chilled water set temperature.

The supply air set temperature Tst is set by adding the present supply air temperature Tss sensed by the supply air temperature sensor 47 to the temperature difference between the temperature Trs sensed by the indoor temperature sensor 46 and the indoor set temperature Ti set by the control part 49. The chilled water set temperature Twt is newly set corresponding to the supply air set temperature Tst newly set.

The controlling the compressor capacity S3 is a step of controlling an operation capacity of the compressor 51 according to the chilled water set temperature Twt set in setting the chilled water set temperature S1 and S2. If the chilled water set temperature is set higher than the previous temperature, the operation capacity of the compressor 51 is controlled lower than the previous capacity.

While the control is performed as stated above, the temperature of the water discharged from the evaporator 54 is higher than before the chilled water set temperature is newly set. The temperature of supply air supplying into the indoor space is higher than the previous temperature sensed by the supply air temperature sensor 47, and the indoor temperature rises.

In the air conditioner according to the exemplary embodiment of the present invention, during the operation, the setting the chilled water set temperature S1 and S2 and the controlling the compressor capacity S3 are repeated at an interval of set time (for example, 10-minutes), the chilled water set temperature Twt is changed according to the load of indoor space, and the chilled water set temperature Twt is changed in the chilled water variable range (for example, 5° C.~15° C.) of the chiller 2.

The steps of decelerating the fan S4 and S5 are steps for reducing the velocity of the fan 27 and 28 when the chilled water set temperature Twt reaches to the upper limit of the chilled water variable range of the chiller 2 (referred to as 'chilled water variable upper limit' hereinafter)

In decelerating the fan S4 and S5, the air handling unit controller 48 receives a signal of deceleration from the chiller controller 59 and controls to decelerate the fans 27 and 28.

When the fans 27 and 28 are decelerated, the amount of air flow supplied to the indoor space is less than before the fans 27 and 28 is decelerated. The indoor temperature is increased than before the fans 27 and 28 is decelerated.

In decelerating the fan S4 and S5, the fans 27 and 28 is decelerated at the intervals of set time (for example, 10-minutes), and the velocity of the fans 27 and 28 is reduced by stages or is reduced linearly.

When the fans 27 and 28 are decelerated, the indoor temperature Trs is equal to or higher than the indoor set temperature Ti. If the indoor temperature Trs is equal to or higher than the indoor set temperature Ti, the step of accelerating the fan S6 and S7 are performed.

The step of accelerating the fan S6 and S7 is a step for increasing the velocity of the fans 27 and 28 when the indoor set temperature Ti is lower than the temperature sensed by the indoor temperature sensor 46 during the step of decelerating the fan S4 and S5. In the step of accelerating the fan S6 and S7, the indoor temperature is decreased than before the fans 27 and 28 is accelerated.

In accelerating the fan S6 and S7, the fans 27 and 28 is accelerated at the intervals of set time (for example, 10-minutes), and the velocity of the fans 27 and 28 is increased by stages or is reduced linearly.

In the operation method of the air conditioner according to the exemplary embodiment of the present invention, the step of decelerating the fan S4 and S5 and the step of accelerating the fan S6 and S7 may be repeated according to the indoor temperature Trs and the indoor set temperature Ti. During the step of accelerating the fan S6 and S7, the fans 27 and 28 can be driven at the maximum velocity of the fan.

In resetting the chilled water set temperature S8 and S9, if the velocity of the fans 27 and 28 reaches to the maximum velocity of the fan during the step of accelerating the fan S6 and S7, the air handling unit 1 senses the temperature and transfers to the chiller 2, and the chiller 2 sets a chilled water set temperature Twt newly.

In resetting the chilled water set temperature S8 and S9, a supply air set temperature Tst is newly set by subtracting the temperature difference between the indoor set temperature Ti and the indoor temperature Trs sensed by the indoor temperature sensor 46 from the supply air temperature sensed by the supply air temperature sensor 47. In addition, a chilled water set temperature Twt is newly set corresponding to the supply air set temperature Tst.

The chilled water set temperature Twt is reset lower than the chilled water variable upper limit of the chiller 2 (for example, 15° C.).

In recontrolling a compressor capacity S10, it controls an operation capacity of the compressor 51 according to the chilled water set temperature Twt set in resetting the chilled water set temperature S8 and S9.

The operation capacity of the compressor 51 is higher than when the chilled water set temperature Twt is equal to the chilled water variable upper limit of the chiller 2. The temperature of the water discharged from the evaporator 54 is lower than before the chilled water set temperature is newly set. The temperature of supply air supplying into the indoor space is lower than when the chilled water set temperature Twt is equal to the chilled water variable upper limit of the chiller 2, and the indoor temperature decreases. Since then, in the air conditioner according to the exemplary embodiment of the present invention, during the operation, the resetting the chilled water set temperature S8 and S9 and the recontrolling the compressor capacity S10 are repeated at the intervals of set time (for example, 10-minutes), and the chilled water set temperature Twt is variable according to the load of indoor space. If a stop signal of air conditioner is inputted by the control part 49, the air conditioner is stopped S11. If the air conditioner is not stopped and the indoor temperature Trs is lower than the indoor set temperature Ti, the step of the setting chilled water set temperature S1 and S2 and the next step are performed sequentially.

The invention claimed is:

1. An operation method of an air conditioner that comprises:
   an air-handling unit, including an air-handling unit case having a space on the inside and comprising an indoor air intake part, an indoor air discharge part, an outdoor air intake part, and an air-conditioned air discharge part,
   an air supply duct connecting the air-handling unit case with indoor space,
   a ventilation duct connecting to the indoor air intake part,
   an air-handling fan for supplying indoor air mixed with outdoor air to an indoor space,
   a heat exchanger for exchanging heat from the mixed air with chilled water, and
   a chiller, including a compressor, a condenser, an expansion device, and an evaporator, wherein a pump supplies the chilled water from the evaporator to the heat exchanger through a water circuit connecting the evaporator and the heat exchanger, and the condenser condenses refrigerant by exchanging heat with outdoor air sent by an outdoor fan,
   wherein the operation method comprises:
      setting a chilled water set temperature for the chiller according to a supply air set temperature;
   wherein the supply air set temperature is a function of 1) a supply air temperature, measured at a location between the air conditioned air discharge part and the heat exchanger, 2) an indoor set temperature, and 3) an indoor temperature, measured either in the ventilation duct or at the indoor air intake part
   controlling the compressor's capacity according to the set chilled water set temperature;
   providing a chilled water variable temperature range that is defined by a minimum permissible chilled water set temperature and a maximum permissible chilled water set temperature;
   decelerating the air-handling fan when the chilled water set temperature is equal to an upper limit of a chilled water variable temperature range after controlling the compressor capacity,
   after decelerating the air handling fan, comparing the indoor set temperature with the indoor temperature,
   if the indoor set temperature is less than the indoor temperature, then accelerating the air handling fan until the air handling fan reaches its maximum velocity;
   when the air handling fan is at its maximum velocity, then re-computing the supply air set temperature and re-controlling the compressor according to the supply air set temperature.

2. The operation method of an air conditioner of claim 1, wherein:

while performing the step of setting the chilled water set temperature, the supply air set temperature is set by adding a present supply air temperature to a temperature difference between the indoor temperature and the indoor set temperature, and the chilled water set temperature is set corresponding to the supply air set temperature.

3. The operation method of an air conditioner of claim 1, further comprising:

stopping decelerating the air-handling fan and then accelerating the air-handling fan if the indoor set temperature is lower than the indoor temperature after decelerating the air-handling fan, wherein the decelerating is performed prior to the accelerating.

4. The operation method of an air conditioner of claim 3, further comprising:

resetting the chilled water set temperature after sensing a temperature by the air handling unit and transmitting the sensed temperature to the chiller if the air-handling fan reaches a maximum velocity; and recontrolling the compressor's capacity according to a chilled water set temperature that is reset.

5. The operation method of an air conditioner of claim 4, wherein:

while performing the step of resetting the chilled water set temperature, the supply air set temperature is set by subtracting a temperature difference between the indoor set temperature and the indoor temperature from the supply air temperature, and the chilled water set temperature is set corresponding to the supply air set temperature.

* * * * *